United States Patent [19]

Thies

[11] 4,398,991
[45] Aug. 16, 1983

[54] HEATING PLATEN FOR A BELT PRESS

[75] Inventor: Peter Thies, Ennepetal-Voerde, Fed. Rep. of Germany

[73] Assignee: Wagener Schwelm GmbH & Co., Schwelm, Fed. Rep. of Germany

[21] Appl. No.: 314,435

[22] Filed: Oct. 23, 1981

[30] Foreign Application Priority Data

Oct. 25, 1980 [DE] Fed. Rep. of Germany ....... 3040372

[51] Int. Cl.³ .............................................. B30B 15/34
[52] U.S. Cl. .............................. 156/583.1; 100/93 P; 156/502; 219/243; 219/254; 219/520; 219/525
[58] Field of Search .............. 156/304.6, 583.1, 583.4, 156/583.7, 583.9, 502; 100/93 P; 219/243, 245, 254, , 520, 525, 537, 539

[56] References Cited

U.S. PATENT DOCUMENTS

| | | | |
|---|---|---|---|
| 3,119,728 | 1/1964 | Janapol | 156/583.9 |
| 3,181,605 | 5/1965 | Smith, Jr. | 156/583.1 |
| 3,393,292 | 7/1968 | Ritscher | 219/254 |
| 4,030,962 | 6/1977 | Fitzwater | 156/583.1 |
| 4,208,574 | 6/1980 | Schafer | 219/245 |

Primary Examiner—Michael G. Wityshyn
Attorney, Agent, or Firm—Karl F. Ross; Herbert Dubno

[57] ABSTRACT

A heating plate, especially for presses utilized to bond two belt ends together, e.g. in the formation of an endless conveyor belt or in the repair of a conveyor belt. According to the invention, the heating effect over the plate which is rectangular or of rhombic configuration, is held uniform by distinguishing between longitudinal edge zones, transverse edge zones, central zones and corner zones, all of which have essentially the same specific volume of material, i.e. the same volume of material with a unit area of the heating surface. A frame work of longitudinal and transverse edge members of the same cross section and intermediate members parallel to the longitudinal edge member and equidistant from one another is sandwiched between a heating plate and a cover plate and the heating elements lie adjacent the heating plate in the spaces between the longitudinal and intermediate members.

5 Claims, 9 Drawing Figures

HEATING PLATEN FOR A BELT PRESS

FIELD OF THE INVENTION

My present invention relates to heating platens for a belt press and, more particularly, to a heated press platen for a press adapted to be used in the bonding together of two belt ends, e.g. for repair of the belt or for interconnection of opposite ends of a length of belt to transform it into an endless conveyor.

BACKGROUND OF THE INVENTION

In the fabrication of conveyor belts and in the repair of conveyor belts, especially conveyor belts composed of vulcanizable material, it is common practice to provide a belt press having a pair of heated platens between which two ends of the web adapted to form the belt may be pressed together and bonded.

Such press platens can be of rectangular or rhombic configuration and serve to provide the heat and pressure necessary to join two ends of a length of conveyor belt so as to transform this length into an endless conveyor, to join an end formed by rupture of a conveyor belt after appropriate trimming to another trimmed end in effecting repair, or to join the belt to inserts which are intended to replace the damaged part. Such platens can also be used in presses for repair of conveyor belts by applying patches thereto.

Since heated platens for this purpose are subjected to considerable stress, they have been constructed heretofore of any generally planar framework of structural steel shapes, a heating plate disposed on one side of this framework, a cover plate on the opposite side and electrical heating means in spaces formed within the framework between the plates.

The typical electric heating elements used for this purpose are planar arrays of meanders of an electric heating element within a tubular support (tube-shaped heatging element) or an array of negative—thermistor heating plates, the latter automatically providing control of the heat output.

A typical frame structure utilized for this purpose comprises longitudinal and transverse edge members, i.e. four edge members, two of which extend along the longitudinal edges of the frame or platen and two of which extend along the transverse edges of the frame or platen, each longitudinal member adjoining a transverse member at a corner of the platen.

In addition, intermediate members can extend between the transverse members parallel to one another and to the longitudinal members and in mutually equispaced relationship. In cross section, all of the intermediate members are identical and all of the edge members are identical.

The heating plate and the cover plate, which are coextensive with the periphgery of the frame, sandwich the frame between them.

When reference is made to flat heating elements, I intend to so designate heating elements which lie in a plane parallel to the heating plate, referably thereagainst, and are capable of generating a surface heating action.

In conventional press platens for this purpose, the flat heating elements have generally been constituted in the form of a so-called heating tube, generally a tube of ceramic material, lying in plane and formed with spiral or meandering turns or loops and provided internally with an electric resistance heating element. While the most common arrangement of the heating element is in the form of an Archimedean spiral, thereby requiring the turns to pass through cut-outs in the frame members, the looped arrangement has also been utilized.

It has been found that such platens have a nonhomogeneous temperature distribution across the heated surface thereof, i.e. the temperature varies significantly over the heated surface.

Furthermore when platens of this type are assembled together with other platens in contiguous relationship this nonhomogeneous temperature distribution is even more pronounced with the greatest deviation from uniformity of temperature distribution being located at the junction.

OBJECTS OF THE INVENTION

It is the principal object of the present invention, therefore, to provide an improved platen for the press of the type described which obviates the disadvantages of earlier heated press platens.

Another object of this invention is to provide a heated press platen with a temperature distribution over its heated surface which is as uniform as possible.

Yet another object of my invention is to provide a heated press platen which can be assembled contiguously with other similar press plants into large area units with a minimum of deviation from temperature uniformity and hence with a minimum of singular zones of temperature inhomogeneity.

SUMMARY OF THE INVENTION

These objects and others which will become apparent hereinafter are attained, in accordance with the present invention, with a press platen which, as in the earlier platens, comprises a frame made of the longitudinal and transverse edge members previously described and in a rectangular or rhombic configuration with intermediate frame members spanned between the transverse members parallel to one another to the longitudinal members, a heating plate at one side of the frame, a cover plate on the other side of the frame, both plates being coextensive with the outer periphery of the frame, and a flat heating element within the frame between the plates adjacent the heating plate.

According to the invention, the platen is considered as if it were composed over the area of the heating plate, of a pair of longitudinal heating zones along the longitudinal edges of the platen, a pair of transverse heating zones along the transverse edge of the platen, four corner heating zones, each at a corner of the platen between an end of a longitudinal heating zone and an adjoining transverse heating zone, a central heating zone surrounded by the previously mentioned heating zones and also of rectangular or rhombic outline. This central heating zone can be considered to be made of a plurality of intermediate heating zones which lie parallel to the longitudinal heating zones and are contiguous with one another and with the longitudinal heating zones.

According to the invention, one of the intermediate frame members lies centrally of each of these intermediate heating zones, each of which has also a parallelogrammatic configuration representing an elongated section of the rectangle or rhombic forming the central heating zones.

The longitudinal heating zones each extend inwardly from the respective longitudinal frame member. The corner and transfer edge heating zones complete the platen and, according to this invention, the specific material volume in all of the heating zones is identical.

The specific material volume is the volume of the metallic materials of the platen per unit area of the heating surface for the respective zone.

According to the invention, moreover, the heating element in the central heating zone has two passes through each space between the intermediate frame members so that each pass heats approximately half of the intermediate heating zone thus formed and, when a plurality of platens are assembled in contiguous relationship, the two longitudinal edge members of the frame which thus abut can form the cross section of an intermediate frame member and likewise can define the intermediate frame member of the larger platen and the respective intermediate heating zone. In addition, the passes of the heating element can lie adjacent the frame members of the longitudinal and transverse heating zones and even in the corner heating zones so that the heat output of this element is uniform over the entire area of the heating plate and thus the platen.

According to one embodiment of the invention, the heating element is an electric resistant heater with the resistance element running through a tube which is bent into a meander configuration with loops whose longitudinal passes each lie adjacent a respective longitudinal frame member and whose transverse passes lie along the intermediate frame members mentioned previously.

This arrangement provides an extremely homogeneous temperature distribution, especially when two linear passes of the heating element lie against the heating plate, slightly spaced from the flange of a respective intermediate frame member within each space defined between two intermediate frame members.

In the spaces between the longitudinal edge frame members and the intermediate members, also two linear passes of the heating element are provided. In the corner heating zones, the heating element can be bent so as generally follow a corner contour and the heating element can have transverse passes or bights whichlie adjacent the transverse edge frame members.

When the heating is effected by negative coefficient heating plates, a multiplicity of these plates in spaced-apart relation are provided along a line having the pattern of the meandering heating element described.

It has been found to be advantageous to form the intermediate frame members as I-beams while the edge frame members are formed as channels of such shape and dimension that a pair of channels in back-to-back relationship have the same cross section as the I-beam.

The heating plate and the cover plate are secured to the flanges of the channels and I-beams and the channels preferably are inwardly open. The connection of the plates to the flanges may be effected by welding or bolting.

The highlight is a heating platen of high dimensional stability and a high degree of temperature homegeneity over the entire heating surface for a single platen or an assembly of contiguous platens formed in the manner described. Naturally, when a plurality of heating platen units together form the assembly in this manner, they should be identical so that their mass, frame profiles and the like correspond and hence the heat distribution in such that there are no singularities at the junctions.

BRIEF DESCRIPTION OF THE DRAWING

The above and other objects, features and advantages of the present invention will become more readily apparent from the following description reference being made to the accompanying drawing in which.

SPECIFIC DESCRIPTION

Figure 1:
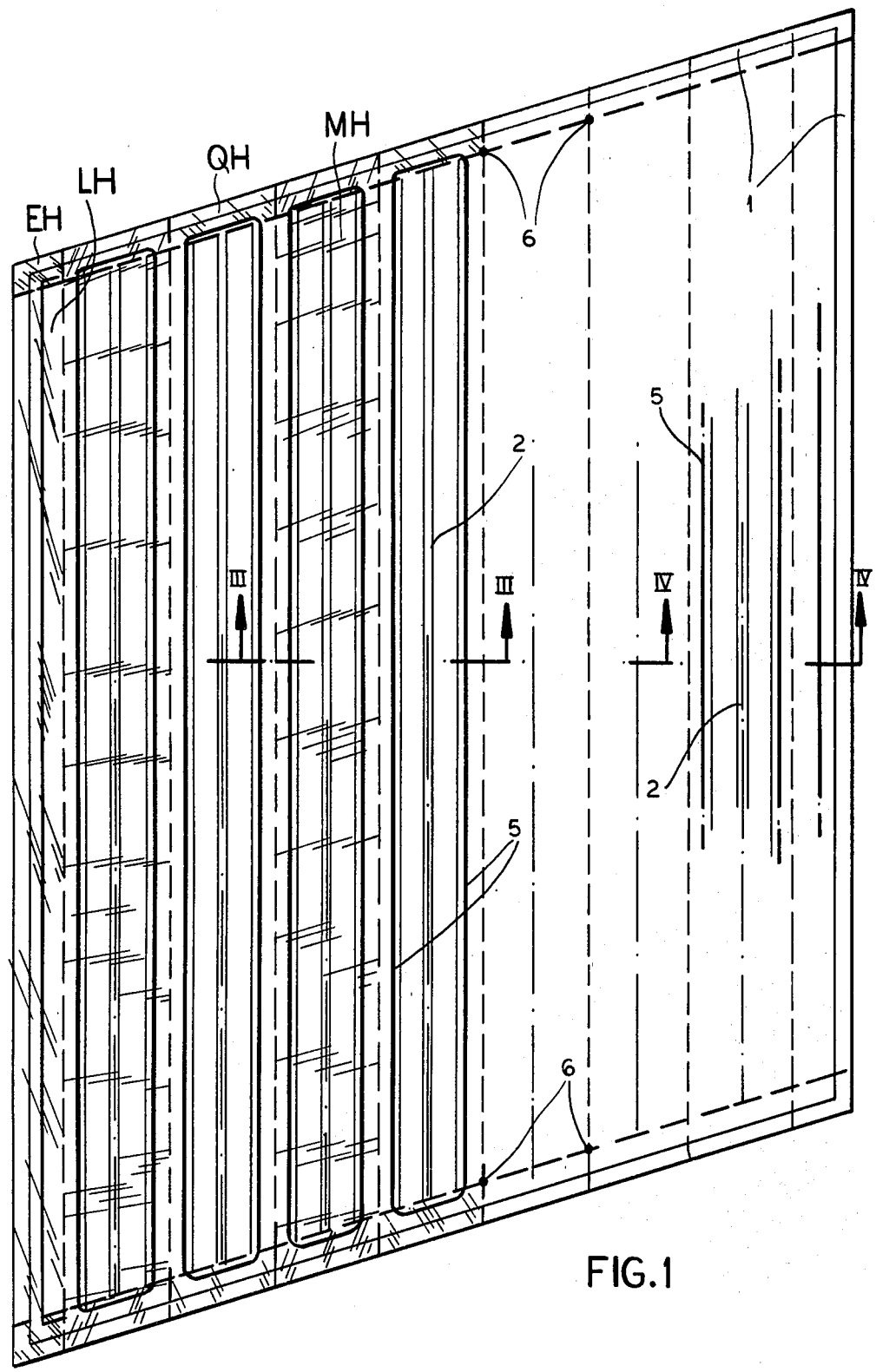
FIG. 1 is a plan view diagrammatically representing arhombic heating platen according to the invention with the various heating zones designated by different forms of shading.

In the drawing I have shown a rhombic platen (FIG. 1) and a rectangular platen (FIG. 2) which can be used in the press for the repair of conveyor belts or for joining two conveyor belt ends together to form an endless conveyor in accordance with the principles described.

Essentially each press platen comprises a platen frame 1, 2, a heating plate 3 turned toward the material to be used and a cover plate 4 turned toward the opposite side.

Figure 2:
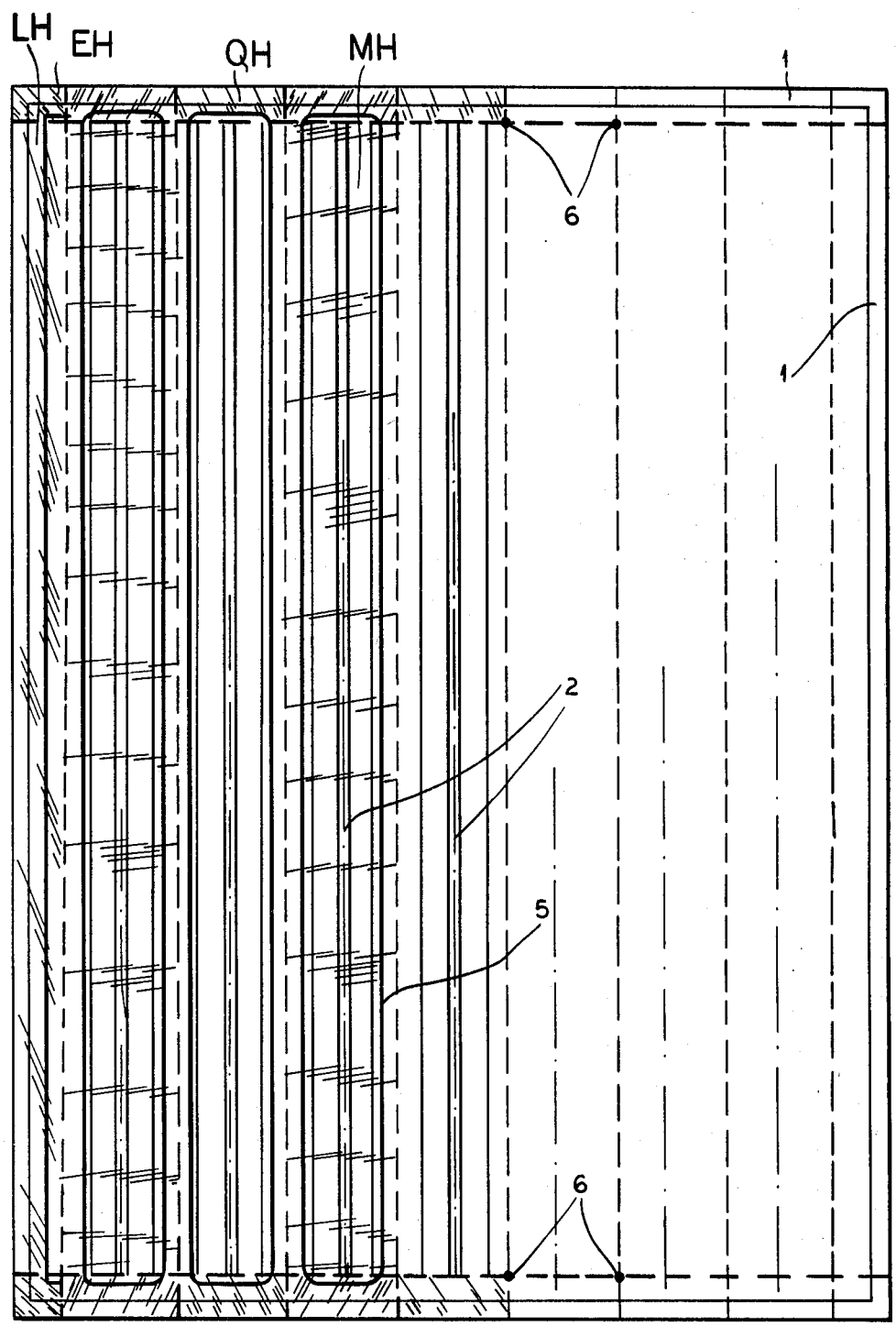
FIG. 2 is a similar view of another embodiment of the invention in which the heating platen has a rectangular configuration.
Figure 3:
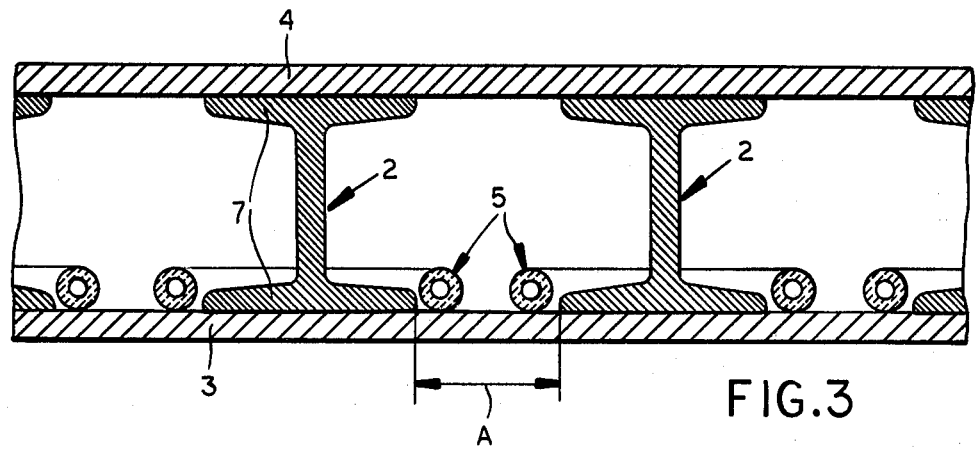
FIG. 3 is a section taken along the line III—III of FIG. 1 greatly enlarged in scale.

Each platen also includes a flat heating element 5 which in the embodiment of FIGS. 1 and 2 comprises a meander-shaped resistive heating element in a heating tube as represented at 5', and in the embodiment of FIGS. 6 through 9 comprises a row of negative coefficient heating plates disposed in similar patterns.

The platen frame comprises four frame members 1 which are of identical channel-shaped profile, including two longitudinal members and two transverse edge members defining the periphery of the frame.

Within this periphery a plurality of mutually parallel, equidistantly spaced transverse frame members 2 are provided whose cross sections are also identical and which are formed as I-beams. The passes of the flat heating element 5 lie against the heating plate 3 within the spaces of compartments A between the intermediate frame members 2 and with a spacing from the edge frame members 1.

Figure 6:
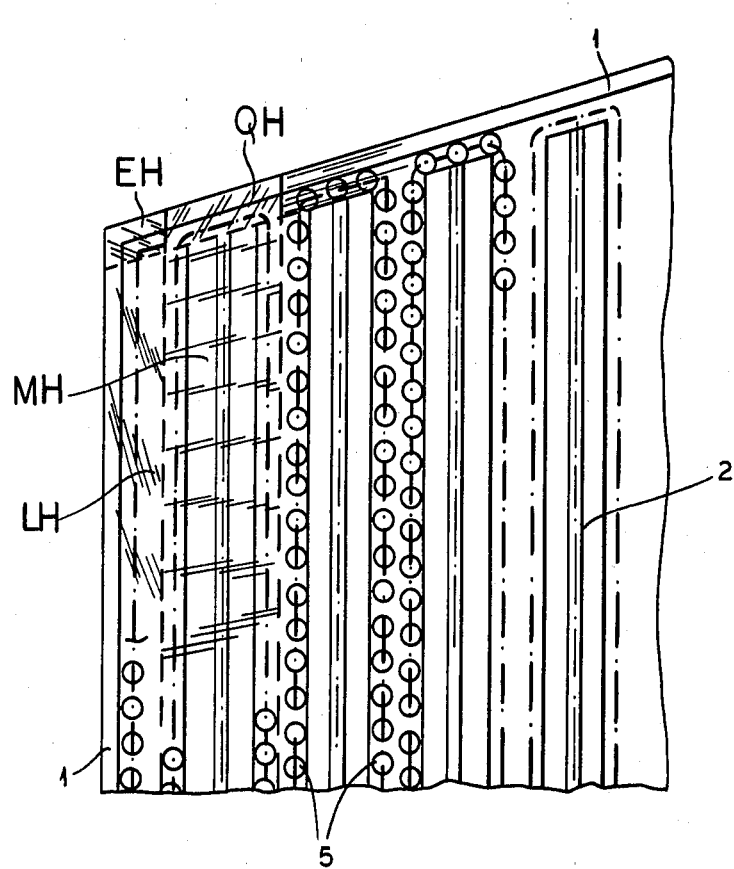
FIG. 6 is a diagrammatic view similar to FIG. 1 showing the application of negative coefficient heating plates as the heating element.
Figure 7:
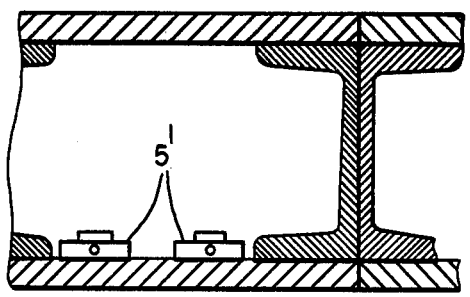
FIG. 7 is a cross section through this embodiment.
Figure 8:
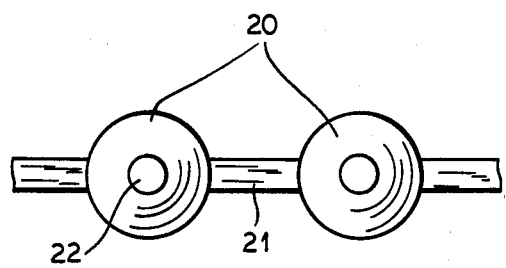
FIG. 8 is a plan view of the heating element.
Figure 9:
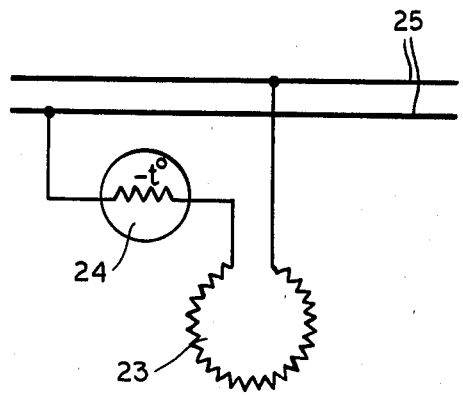
FIG. 9 is a diagram illustrating the principles of the negative coefficient heating element.

As can be seen from FIGS. 1, 2 and 6 by the different shadings utilized, the surface of the heating platen can be considered as having a central heating zone formed with a plurality of adjacent intermediate heating zones MH, transverse edge heating zones QH at the upper and lower ends of the platen, corner heating zones EH at the four corners and longitudinal edge heating zones LH. Only some of these zones have been outlined by the shading.

The intermediate heating zones MH each have a parallelogrammatic or rectangular zone outline and have extending through the center of each zone a respective intermediate frame member 2 so that the four corners 6 of each intermediate zone adjoin the corners framed between longitudinal and transverse edge zones and corner zones or thus formed between the next intermediate zone and the transverse edge zones.

The arrangement of the frame members and plates is such that the specific material volume in all heating zones is identical.

According to the invention, moreover, the heating element 5 has longitudinal passes in each space A between the intermediate frame membes 2 so positioned that each pass is half of the space between intermediate members and thus contributes to heating of two adjacent intermediate zones. The same applies to the passes to the spaces C between each longitudinal edge member 1 and the next intermediate edge number 2.

In the corners the heating element is bent to follow the corner contour and the bights of the heating element by adjusting the transverse edge members so that the specific heat output, i.e. the heat output per unit area, is identical over the entire platen.

In FIGS. 6 through 9, I have shown a heating element 5 or 5' which comprises a chain of spaced apart negative coefficient heating plates 20 which are interconnected by a duct 21 through which the energizing electrical conductor passes. Each heating plate 20 can be integral with a negative coefficient element and can be provided with a thermistor 22. Thus from FIG. 9, it can be seen that the heating plates can be formed with resistive heating elements 23 connected in series with a negative temperature coefficient thermistor 24 to the energizing lines 25. The heating plates are thus self regulated. For a constant applied voltage, an increase in the heat output of the plate will result in the decrease of the current delivery to each heating member and thus the self regulation effect contributes to the uniformity of temperature throughout the platen.

FIG. 6 shows that the heating element made up of the spaced apart plates 20 follows the patterns described for the heating tube 5'.

Figure 4:
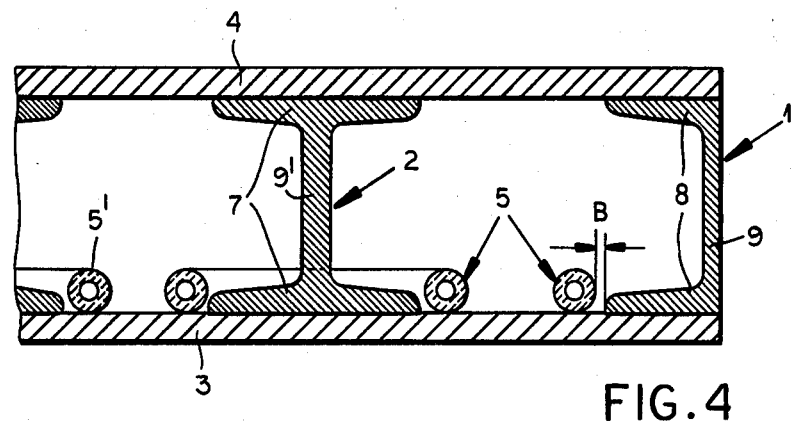
FIG. 4 is a section taken along the line IV—IV of FIG. 1 to the same scale as FIG. 3.
Figure 5:
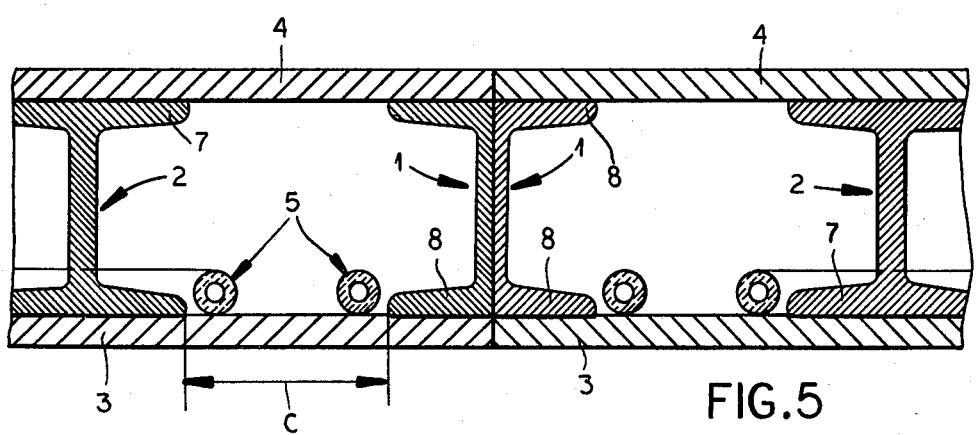
FIG. 5 is a crosssectional view corresponding to FIG. 4 but illustrating an embodiment in which two platens are joined contiguously for form a platen assembly.

As can be seen from FIG. 5, the longitudinal edge frame members are channels whose flanges 8 are secured to the heating plate 3 and the cover plate 4 although the web 9 connecting these flanges is half the thickness of the web 9' connecting the flanges 7 of the I-beams of the intermediate members. Thus when two such platens are brought together contiguously as shown in FIG. 4, the abutting edge members 1 forms an intermediate member of the larger platen thus assembled.

I claim:

1. A press platen for a belt-repair or belt-end-joining press comprising:
    a four-sided frame formed by a pair of opposite longitudinal edge members, a pair of opposite transverse edge members, and a plurality of equispaced intermediate members extending parallel to said longitudinal edge members, all of said edge members having the same cross section, all of said intermediate members having the same cross section;
    a heating plate coextensive with the periphery of said frame and secured thereto along a side of said plate adapted to engage material to be pressed;
    a cover plate coextensive the periphery of said frame and secured thereto along a side of said platen turned away from said material; and
    a flat electrical heating element lying against said heating plate, said heating element including longitudinal passes extending along said longitudinal and intermediate members with two such passes disposed in each space between intermediate members and between an intermediate member and a longitudinal edge member, bights of said heating element lying along said transverse edge member, said heating plate being formed with transverse heating zones along transverse edges of the platen, longitudinal heating zones along longitudinal edges of the platen, and corner heating zones between each end of a transverse heating zone and an end of a longitudinal heating zone, and a central heating zone surrounded by said corner, longitudinal and transverse heating zones, said central heating zone being formed from a plurality of parallel intermediate heating zones each of which is centered over a respective one of said intermediate members, said frame and said plates having configurations such that the specific material volume is the same in all of said zones, said heating element including bends at said corner heating zones, the specific heat output of said element being uniform over the area of said heating plate.

2. The press platen defined in claim 1 wherein said heating element is a heating tube and said frame members have flanges lying against said heating plate, said passes of said tube being spaced uniformly from said flanges.

3. The press platen defined in claim 1 wherein said heating element comprises a multiplicity of spaced-apart negative coefficient heating units.

4. The press platen defined in claim 1, claim 2 or claim 3 wherein said longitudinal and transverse members are inwardly open channels having flanges secured to said plates and said intermediate members being I-beams having flanges secured to said plates.

5. The press platen defined in claim 4 wherein a second platen is longitudinally contiguous with the first mentioned platen to form a platen assembly and longitudinal members of two platens abut, the abutting longitudinal members having the same cross section as that of one of said intermediate members.

* * * * *